US012552645B2

(12) United States Patent
Wu et al.

(10) Patent No.: US 12,552,645 B2
(45) Date of Patent: Feb. 17, 2026

(54) CRANE AND CONTROL METHOD THEREFOR

(71) Applicant: ZHEJIANG SANY EQUIPMENT CO., LTD., Huzhou (CN)

(72) Inventors: Menggang Wu, Huzhou (CN); Jiwen Peng, Huzhou (CN); Yunxiao Mei, Huzhou (CN); Yutao Sun, Huzhou (CN); Xiaobin Yu, Huzhou (CN)

(73) Assignee: ZHEJIANG SANY EQUIPMENT CO., LTD., Huzhou (CN)

( * ) Notice: Subject to any disclaimer, the term of this patent is extended or adjusted under 35 U.S.C. 154(b) by 487 days.

(21) Appl. No.: 18/155,276

(22) Filed: Jan. 17, 2023

(65) Prior Publication Data

US 2023/0150804 A1 May 18, 2023

Related U.S. Application Data

(63) Continuation of application No. PCT/CN2021/102329, filed on Jun. 25, 2021.

(30) Foreign Application Priority Data

Nov. 9, 2020 (CN) ........................ 202011242474.9

(51) Int. Cl.
*B66C 23/82* (2006.01)
*B66C 23/90* (2006.01)

(52) U.S. Cl.
CPC ............ *B66C 23/825* (2013.01); *B66C 23/90* (2013.01); *B66C 2700/082* (2013.01)

(58) Field of Classification Search
CPC . B66C 23/825; B66C 23/90; B66C 2700/082; B66C 23/82; B66C 23/905
See application file for complete search history.

(56) References Cited

U.S. PATENT DOCUMENTS

2012/0152878 A1 6/2012 Ishihara et al.
2012/0312767 A1 12/2012 Bohnacker et al.
2024/0083719 A1 3/2024 Kurihara et al.

FOREIGN PATENT DOCUMENTS

CN 102431896 A 5/2012
CN 102718160 A 10/2012
(Continued)

OTHER PUBLICATIONS

International Search Report issued in corresponding PCT Application No. PCT/CN2021/102329, dated Aug. 30, 2021.
(Continued)

*Primary Examiner* — Anne Marie Antonucci
*Assistant Examiner* — Josephine Elizabeth Rich
(74) *Attorney, Agent, or Firm* — Westbridge IP LLC

(57) ABSTRACT

Disclosed are a crane and a control method therefor. The crane comprises a body, a boom, a luffing mechanism, a tension sensor, and a controller. One end of the boom is rotatably connected with the body. The luffing mechanism is respectively connected to the body and the boom. The tension sensor is disposed on the luffing mechanism, and the tension sensor is used for detecting a tension value of the luffing mechanism to the boom. The controller is electrically connected to the tension sensor and the luffing mechanism, and the controller is configured to determine that the arm length of the boom exceeds an arm length threshold if the tension value is greater than a tension threshold.

10 Claims, 6 Drawing Sheets

(56) References Cited

FOREIGN PATENT DOCUMENTS

| | | | | | |
|---|---|---|---|---|---|
| CN | 103863959 | A | | 6/2014 | |
| CN | 105084213 | A | | 11/2015 | |
| CN | 105731273 | A | | 7/2016 | |
| CN | 105731273 | B | | 1/2018 | |
| CN | 207684828 | U | | 8/2018 | |
| CN | 110182690 | A | | 8/2019 | |
| CN | 111747328 | A | * | 10/2020 | ............. B66C 23/88 |
| CN | 112390178 | A | | 2/2021 | |
| CN | 214059697 | U | | 8/2021 | |
| DE | 102011107754 | A1 | | 12/2012 | |
| DE | 102012025111 | A1 | | 6/2014 | |
| DE | 102017113386 | A1 | | 12/2018 | |
| JP | H0761777 | A | * | 3/1995 | |
| JP | 4415643 | B2 | | 2/2010 | |
| JP | 2016199366 | A | * | 12/2016 | |
| JP | 2020063128 | A | | 4/2020 | |
| WO | WO-2012042863 | A1 | * | 4/2012 | ............. B65G 63/00 |

OTHER PUBLICATIONS

Extended European Search Report issued in counterpart European Patent Application No. 21888173.8, dated Oct. 30, 2023.

Written Opinion issued in counterpart Singaporean Patent Application No. 11202300478S, dated May 7, 2025.

* cited by examiner

CRANE AND CONTROL METHOD THEREFOR

CROSS-REFERENCE TO RELATED APPLICATIONS

This application is a continuation of International Application No. PCT/CN2021/102329, filed on Jun. 25, 2021, which claims priority to Chinese Patent Application No. 202011242474.9, filed on Nov. 9, 2020, entitled "Crane and Control Method Therefor". All of the aforementioned applications are incorporated herein by reference in their entireties.

TECHNICAL FIELD

The application relates to the technical field of construction machinery, and in particular, to a crane and a control method therefor.

BACKGROUND

The boom of transporter crane is segmented and needs to be installed or removed section by section when in use. In the course of disassembly and assembly of the boom, the luffing mechanism will be connected to the boom heel section of the boom. As shown in FIG. 1, the boom 2 is now in a cantilevering state, which is equivalent to a cantilever beam, and the joint between the luffing mechanism 3 and the boom heel section 21 is stressed greatly. Generally, the structure of the joint is designed according to the allowable arm length. When the actual arm length is greater than the allowable value, it will cause the damage of the boom heel section and the luffing mechanism, and bring the risk of the boom falling to the ground. The existing safety measure is to paste the warning sign of the allowable arm length in the cab of truss crane, and add the corresponding content in the product manual. However, if the operator operates by mistake, it will still cause damage to the boom, pose a potential safety hazard.

SUMMARY

The embodiment of the application provides a crane and a control method therefor. The aim is to avoid the problem that the boom and the luffing mechanism are damaged due to too long arm length.

The embodiment of the application provides a crane, including: a body, a boom, a luffing mechanism, a tension sensor and a controller; one end of the boom is rotationally connected with the body; the luffing mechanism is respectively connected with the body and the boom; the tension sensor is disposed on the luffing mechanism, and the tension sensor is used for detecting the tension value of the luffing mechanism to the boom; the controller is electrically connected with the tension sensor and the luffing mechanism, and the controller is configured to determine that the arm length of the boom exceeds the arm length threshold if the tension value is greater than the tension threshold.

The crane according to one embodiment of the application further includes an angle sensor, where the angle sensor is disposed on the boom, and the angle sensor is used for detecting the horizontal inclination angle value of the boom;

The controller is electrically connected with the angle sensor, and the controller is configured to determine that the arm length of the boom exceeds the arm length threshold if the horizontal inclination angle value is less than the angle threshold and the tension value is greater than the tension threshold.

The crane according to one embodiment of the application, the boom includes a boom heel section rotationally connected with the body, and the angle sensor is disposed on the boom heel section.

The crane according to one embodiment of the application, the angle sensor is disposed at one end of the boom heel section near the body.

The crane according to one embodiment of the application further includes an in-place detecting sensor, where the in-place detecting sensor is disposed at the joint between the boom and the luffing mechanism, and the in-place detecting sensor is used for generating a trigger signal when the boom is being connected with the luffing mechanism;

The controller is electrically connected with the in-place detecting sensor, and the controller is configured to determine that the arm length of the boom exceeds the arm length threshold when the trigger signal is received and the tension value is greater than the tension threshold.

The crane according to one embodiment of the application, the in-place detecting sensor is disposed on the boom.

The crane according to one embodiment of the application, the in-place detecting sensor is a proximity switch or a travel switch.

The crane according to one embodiment of the application, the controller is disposed on the body.

The crane according to one embodiment of the application, the luffing mechanism is connected with the boom through a boom pull plate and a luffing rope, and the tension sensor is disposed on the boom pull plate or the luffing rope.

The crane according to one embodiment of the application, the luffing mechanism includes a fixed pulley block, a movable pulley block and a luffing rope, where the movable pulley block is connected with the fixed pulley block through the luffing rope, and the fixed pulley block is rotationally connected with the boom.

The embodiment of the application also provides a control method of crane, which includes:

- obtaining the tension value of the luffing mechanism to the boom;
- determining the arm length of the boom exceeds the arm length threshold if the tension value is greater than the tension threshold.
- the control method of crane according to one embodiment of the application, before determining the arm length of the boom exceeds the arm length threshold if the tension value is greater than the tension threshold, the method further includes:
- obtaining the horizontal inclination angle value of the boom;
- determining the arm length of the boom exceeds the arm length threshold if the tension value is greater than the tension threshold includes:
- determining the arm length of the boom exceeds the arm length threshold if the horizontal inclination angle value is less than the angle threshold and the tension value is greater than the tension threshold.
- the control method of crane according to one embodiment of the application, determining the arm length of the boom exceeds the arm length threshold if the tension value is greater than the tension threshold includes:
- determining the arm length of the boom exceeds the arm length threshold if a trigger signal is received and the tension value is greater than the tension threshold, where the trigger signal is used to indicate that the boom connects whit the luffing mechanism.

the control method of a crane according to one embodiment of the application, after determining the arm length of the boom exceeds the arm length threshold if the tension value is greater than the tension threshold, the control method further includes:

generating a protection signal, where the protection signal is used for prohibiting the luffing mechanism from performing the boom lifting.

The embodiment of the application also provides a control device of crane, which includes: a tension value obtaining unit and a determining unit, the tension value obtaining unit is used for obtaining the tension value of the luffing mechanism to the boom; The determining unit is used for determining the arm length of the boom exceeds the arm length threshold if the tension value is greater than the tension threshold.

The embodiment of the application also provides a crane control device, which includes a memory, a processor and a computer program stored in the memory and running on the processor, when the processor executes the program, it implements the steps of the control method of the crane described above.

The embodiment of the application also provides a non-transient computer-readable storage medium on which a computer program is stored, when the computer program is executed by the processor, it implements the steps of the control method of the crane described above.

The crane and the control method therefor provided by the embodiment of the application detect the tension value of the luffing mechanism to the boom through the tension sensor, and determine whether the arm length of the boom exceeds the arm length threshold according to the tension value, thereby avoid the problem of overload damage to the boom.

BRIEF DESCRIPTION OF THE DRAWINGS

To illustrate more clearly the embodiment of the application or the technical proposal in the prior art, a brief description of the accompanying drawings required for use in the description of the embodiment or the existing technology is provided below, Obviously, the attached drawings described below are some embodiments of this application, from which other drawings may be obtained without creative effort by those of ordinary skill in the art.

DETAILED DESCRIPTION OF THE EMBODIMENTS

In order to make the purpose, technical scheme and advantages of the embodiment of the present application clearer, the technical scheme in the embodiment of the present application will be clearly and completely described below with reference to the drawings in the embodiment of the present application. Obviously, the described embodiment is a part of the embodiment of the present application, but not the whole embodiment. Based on the embodiments in this application, all other embodiments obtained by ordinary technicians in this field without creative labor belong to the scope of protection in this application.

Figure 1:
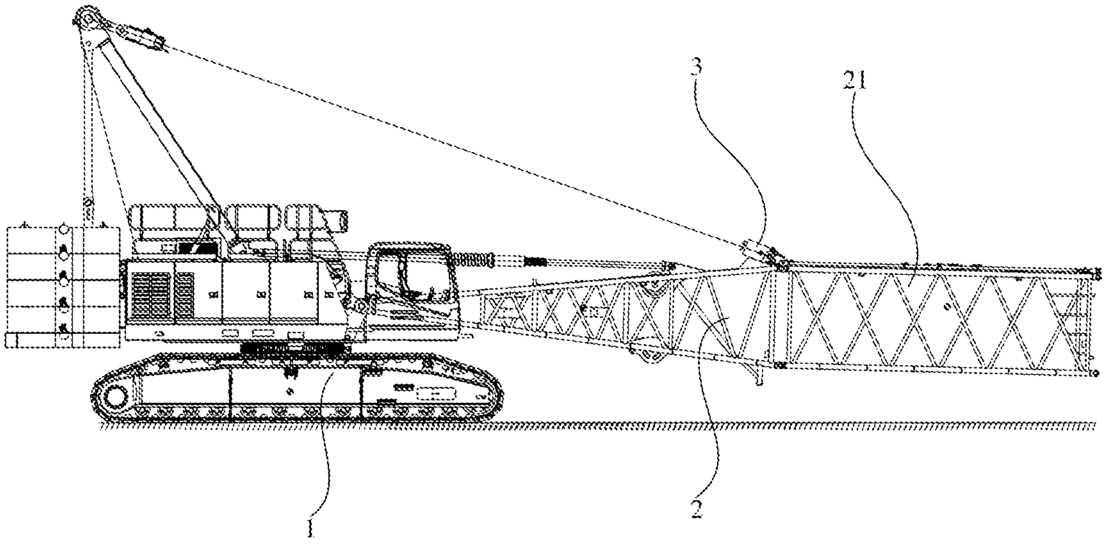
Fig. 1 (Prior Art)
FIG. 1 is a structural schematic diagram of an existing crane.
Figure 2:
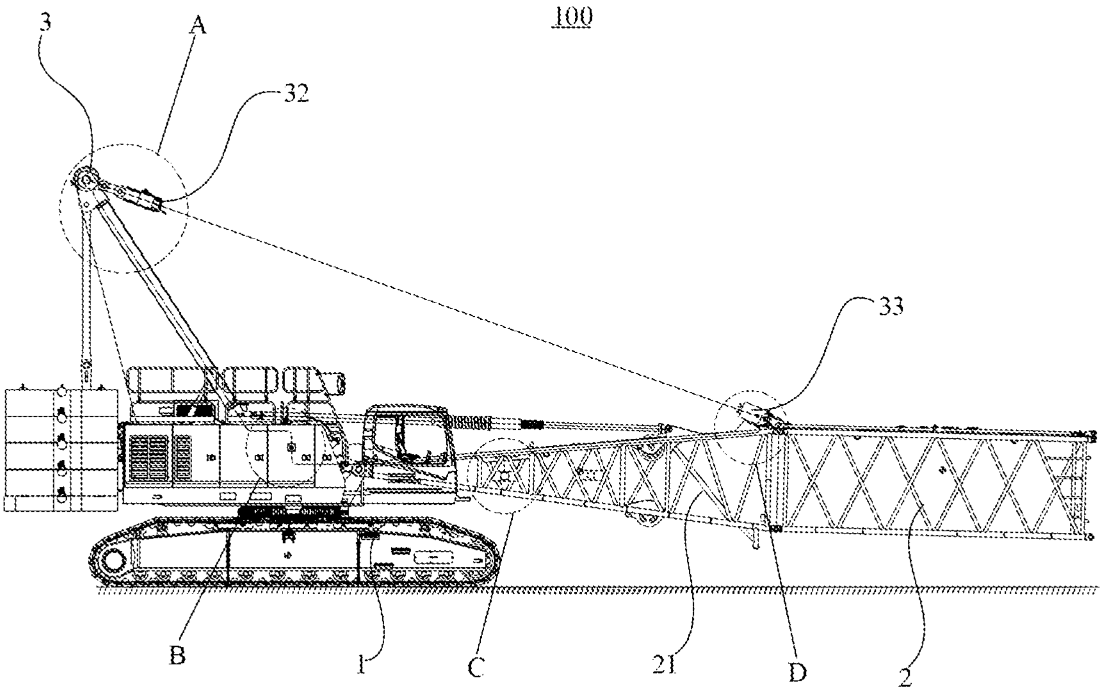
FIG. 2 is a structural schematic diagram of a crane provided by an embodiment of this present application.
Figure 3:
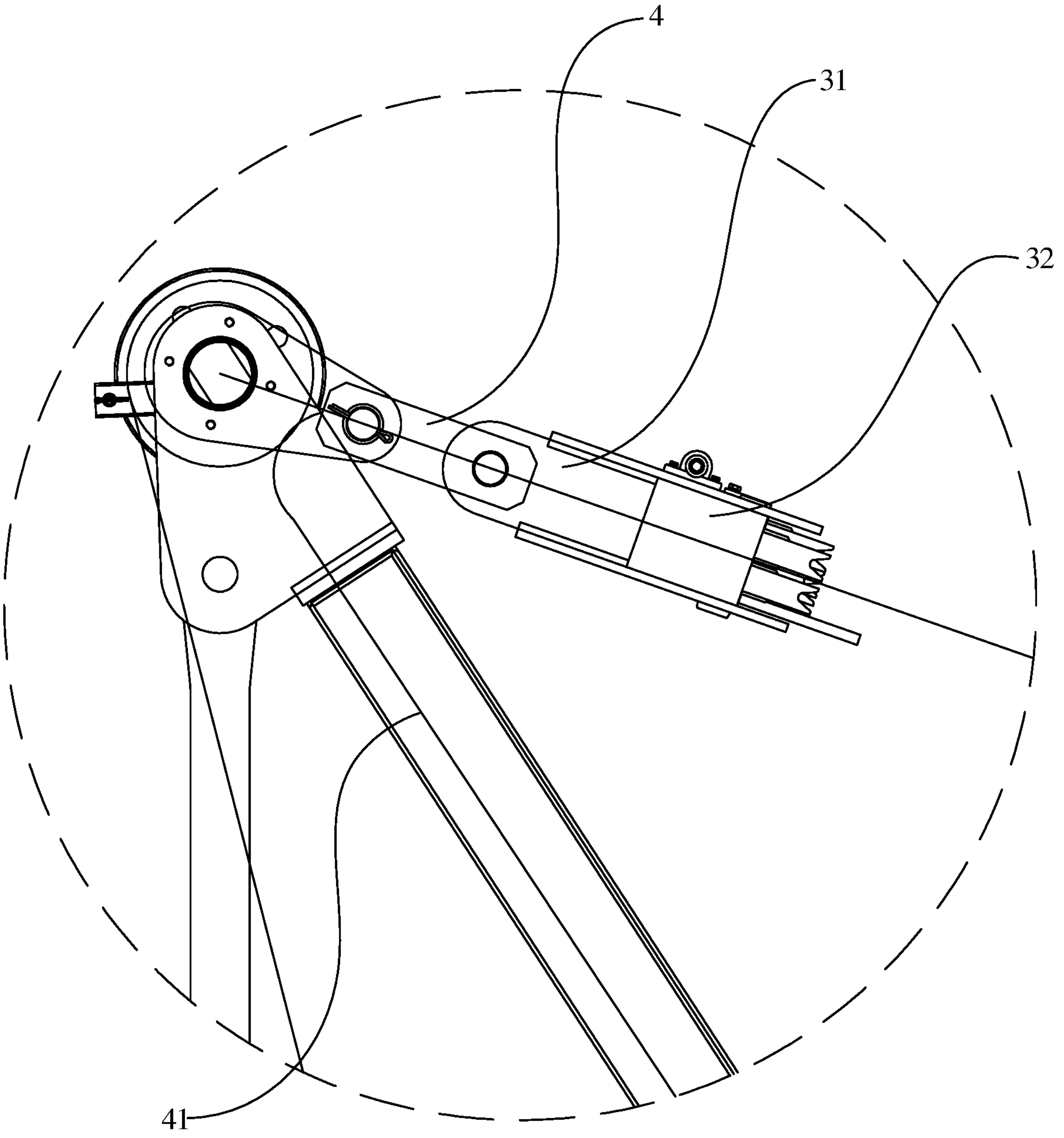
FIG. 3 is an enlarged schematic view at A in FIG. 2.
Figure 4:
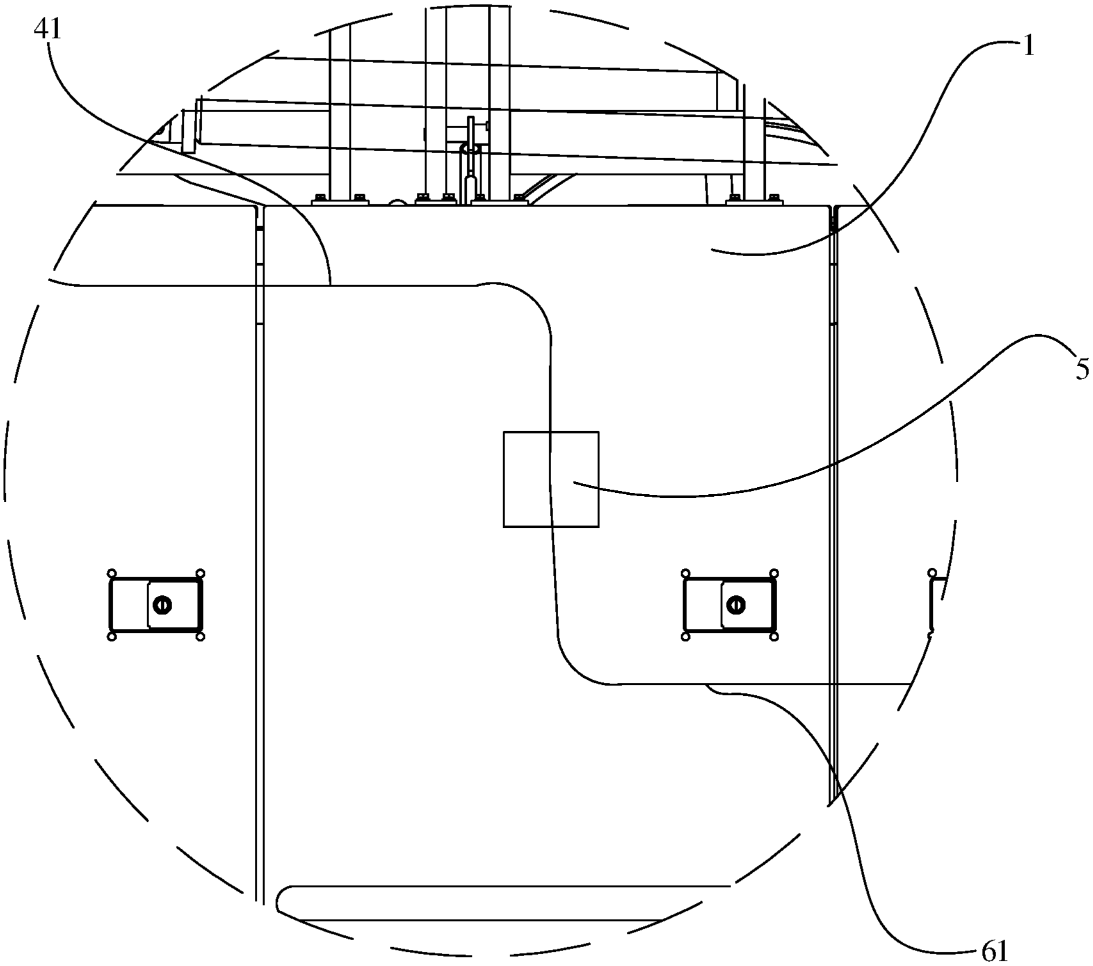
FIG. 4 is an enlarged schematic view at B in FIG. 2.

The crane according to the embodiment of the present application will be described below with reference to FIGS. 2 to 6. As shown in FIGS. 2 to 4, the crane 100 includes a body 1, a boom 2, a luffing mechanism 3, a tension sensor 4, and a controller 5.

As shown in FIG. 2, one end of the boom 2 is rotationally connected to the body 1. Specifically, in the embodiment, as shown in FIG. 2, the boom 2 includes a boom heel section 21, one end of which is rotationally connected to the body 1.

As shown in FIG. 2, the luffing mechanism 3 connects the body 1 and the boom 2, respectively. The crane 100 can drive the boom 2 to rotate through the luffing mechanism 3 to complete the boom lifting. An end of the boom 2 close to the body 1 is regarded as the rear end of the boom 2, an end of the boom 2 far away from the body 1 is regarded as the front end of the boom 2, and the part of the boom 2 facing upwards in the cantilevering state is regarded as the top of the boom 2. The luffing mechanism 3 is usually connected to the top of the boom 2, for example, the luffing mechanism 3 is connected to the top of the front end of the boom heel section 2. Specifically, as shown in FIG. 2, in the embodiment, the luffing mechanism 3 includes a fixed pulley block 32, a movable pulley block 33, and a luffing rope (not shown in the drawing), where the movable pulley block 33 is connected to the fixed pulley block 32 through the luffing rope, the fixed pulley block 32 is rotatably connected to the boom 2, and so the boom lifting can be completed by dragging the luffing rope with a winch, Wherein the rotating axis direction of the fixed pulley block 32 is the same as that of the boom 2.

As shown in FIGS. 2 and 3, a tension sensor 4 is provided at the luffing mechanism 3, and is used to detect a tension value of the luffing mechanism 3 to the boom 2. A portion of the boom 2 in front of a connection point between the luffing mechanism 3 and the boom 2 generates a tension at the connection point, and a tension sensor 4 detects the tension formed at the connection point. The specific position of the tension sensor 4 on the luffing mechanism 3 may not be particularly limited. For example, the luffing mechanism 3 is connected to the boom 2 through the boom pull plate 31 and the luffing rope, and the tension sensor 4 may be disposed at the boom pull plate 31 to detect the tension of the boom pull plate 31; The tension sensor 4 may also be disposed at the luffing rope to detect the tension of the luffing rope. Also one or more of the tension sensors 4 may be provided, for example two of the tension sensors 4 may be arranged symmetrically along the rotation axis of the boom 2.

As shown in FIGS. 2 and 4, the controller 5 is electrically connected to the tension sensor 4 and the luffing mechanism 3, and is configured to determine that the arm length of the boom 2 exceeds an arm length threshold if the tension value is greater than a tension threshold. The tension sensor 4 transmits the detected tension value to the controller 5 which can judge the arm length of the boom 2 according to the detected tension value. Usually, the larger the detected tension value, the longer the arm length of the boom 2.

Figure 5:
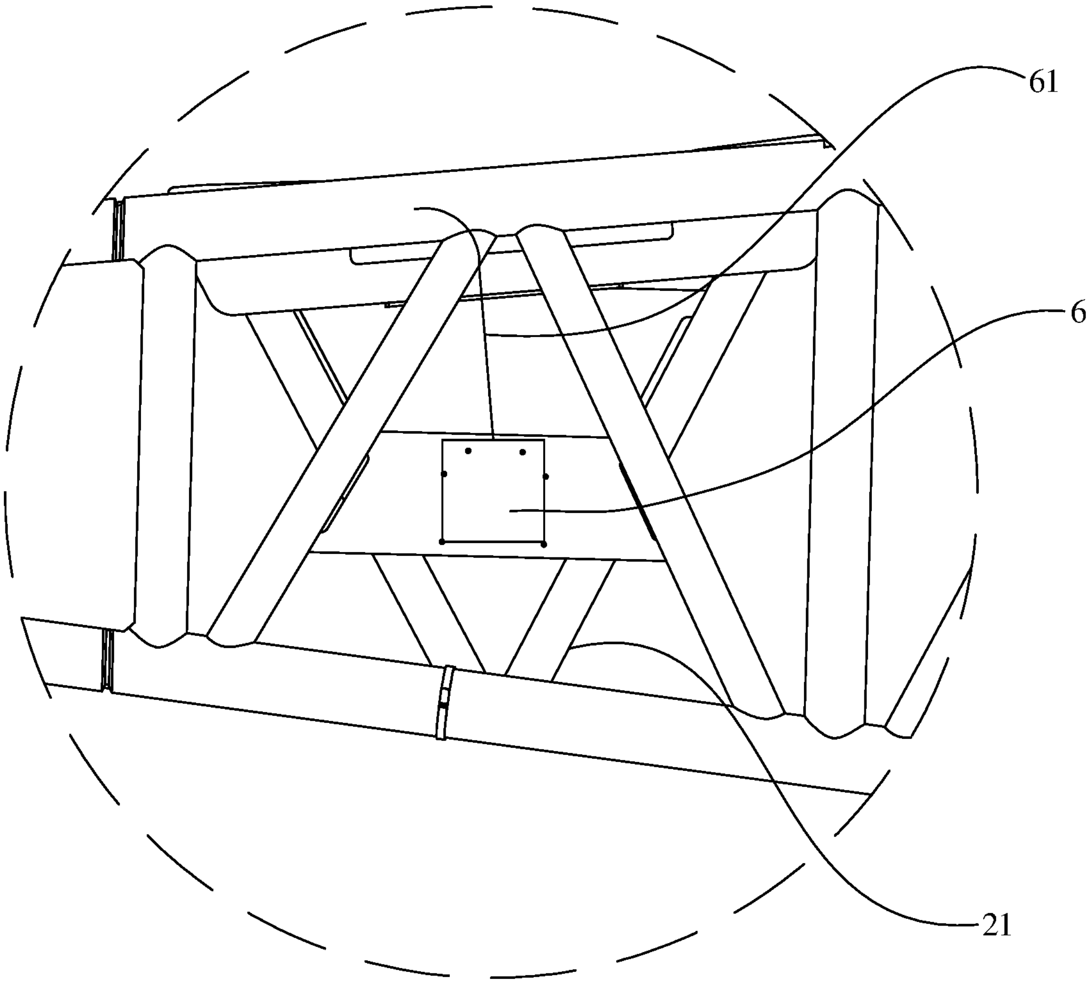
FIG. 5 is an enlarged schematic view at C in FIG. 2.

Therefore, the controller 5 determines that the arm length of the boom 2 exceeds the arm length threshold when the tension value is greater than the tension threshold, and prohibits the luffing mechanism 3 from performing the boom lifting, thereby achieving the effect of avoiding overload damage to the boom 2; the controller 5 determines that the arm length of the boom 2 does not exceed the arm length threshold when the tension value is smaller than the tension threshold, and allows the luffing mechanism 3 to perform the boom lifting. The controller 5 may be disposed on the body 1, the luffing mechanism 3 or the boom heel section 21, etc. For example, as shown in FIG. 4, the controller 5 is disposed on the body 1, and the controller 5 is electrically connected to the tension sensor 4 through the first connection line 41. When the tension value is equal to the tension threshold, the judgment result of the controller 5 can be set according to the actual situation. In one case, the controller 5 determines that the arm length of the boom 2 exceeds the arm length threshold when the tension value is equal to the tension threshold; In another case the controller 5 determines that the arm length of the boom 2 does not exceed the arm length threshold when the pull value is equal to the tension threshold. As shown in FIGS. 2 and 5, in the embodiment, the crane 100 further includes an angle sensor 6 provided on the boom 2, and the angle sensor 6 is used for detecting the horizontal inclination angle of the boom 2; The controller 5 is electrically connected to the angle sensor 6 and is configured to determine that the arm length of the boom 2 exceeds the arm length threshold if the horizontal inclination angle is less than an angle threshold and the tension value is greater than the tension threshold. The angle sensor 6 can detect the relative angle of the boom 2 to the horizontal plane (i.e., the horizontal inclination value), and transmit the detected horizontal inclination angle value to the controller 5, the controller 5 can judge the working state of the boom 2 according to the detected horizontal inclination angle value. when the boom 2 is in a working state of self-loading and unloading, the boom 2 usually does not undergo an overload damage, so the subsequent protection may not be performed; When the boom 2 is in a working state of cantilevering, the subsequent protection is necessary. For example, when the angle sensor 6 detects that a horizontal inclination angle is greater than 10 degrees, the controller 5 determines that the boom 2 is now in a self-loading and unloading state, and the controller 5 will not perform the subsequent protection, allowing the luffing mechanism 3 to perform the boom lifting; when the angle sensor 6 detects that a horizontal inclination angle is less than 10 degrees, the controller 5 will continue to acquire the tension value of the tension sensor 4. When the tension value is less than the tension threshold, the controller 5 determines that the arm length of the boom 2 does not exceed the arm length threshold and allows the luffing mechanism 3 to perform the boom lifting; when the tension value is greater than the tension threshold, the controller 5 determines that the arm length of the boom 2 exceeds the arm length threshold and prohibits the luffing mechanism 3 from performing the boom lifting, thereby achieving the effect of avoiding overload damage to the boom 2. When the horizontal inclination angle is equal to the angle threshold, the judgment result of the controller 5 can be set according to the actual situation. In one case, the controller 5 determines that the boom 2 is in a self-loading and unloading state when the horizontal inclination angle is equal to the angle threshold; in another case, the controller 5 determines that the boom 2 is in a cantilevering state when the horizontal inclination angle is equal to the angle threshold. one or more angle sensors 6 may be provided, for example two angle sensors 6 may be symmetrically arranged along the rotation axis direction of the boom 2.

An angle sensor 6 is provided on the boom 2, as shown in FIGS. 2 and 5, the angle sensor 6 is generally disposed on the boom heel section 21. In particular, in this embodiment, the angle sensor 6 is disposed on one end of the boom heel section 21 close to the body 1, so as to facilitate wiring the angle sensor 6 to the controller 5, where the angle sensor 6 is electrically connected to the controller 5 through a second connection line 61.

Figure 6:
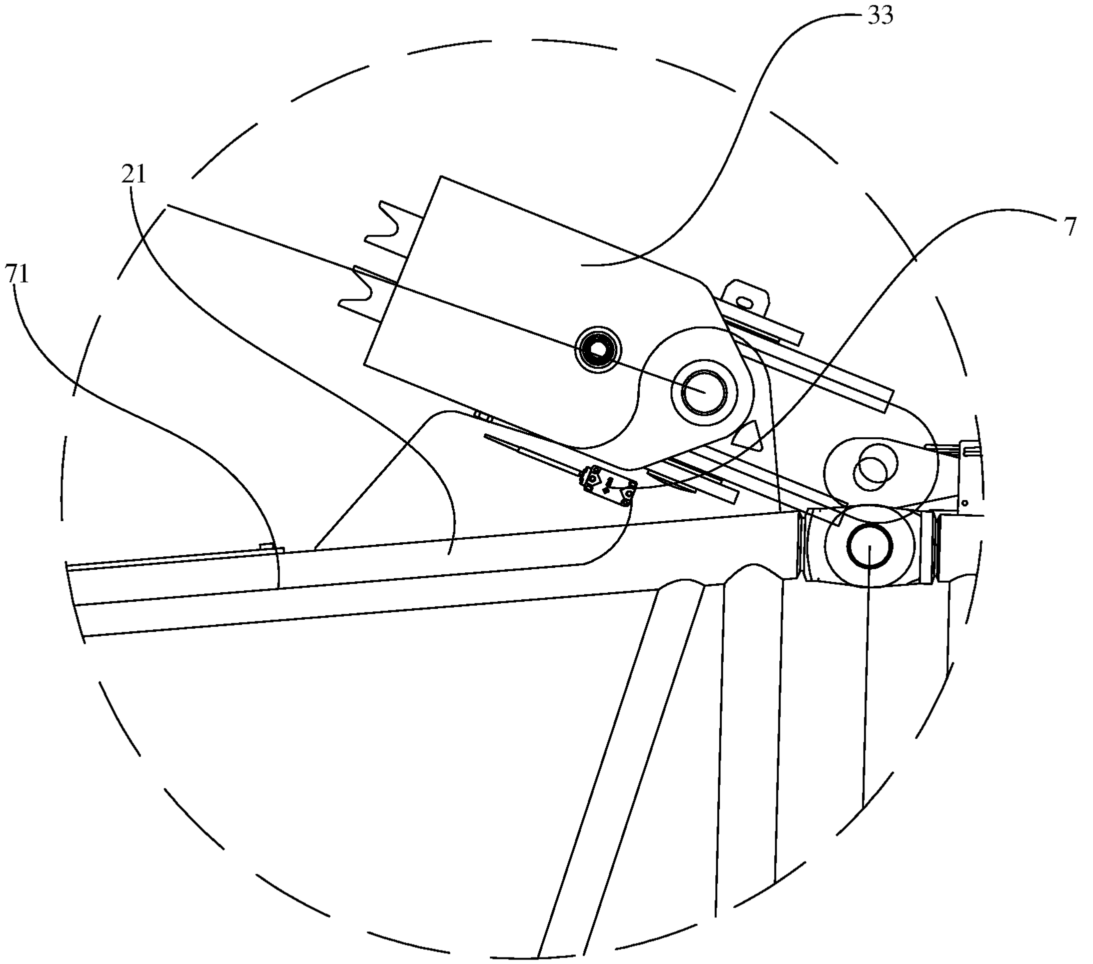
FIG. 6 is an enlarged schematic view at D in FIG. 2.

As shown in FIGS. 2 and 6, in the embodiment, the crane 100 further includes an in-place detecting sensor 7 provided at the joint between the boom 2 and the luffing mechanism 3, and the in-place detecting sensor 7 is used for generating a trigger signal when the boom 2 is connected with the luffing mechanism 3. The controller 5 is electrically connected to the in-place detecting sensor 7, and is configured to determine that the arm length of the boom 2 exceeds the arm length threshold if the trigger signal is received and the tension value is greater than the tension threshold. The in-place detecting sensor 7 can detect whether the boom 2 is connected to the luffing mechanism 3, and when the boom 2 is not connected to the luffing mechanism 3, the controller 5 may not perform the subsequent protection; when the boom 2 is connected to the luffing mechanism 3, the in-place detecting sensor 7 will generate a trigger signal and transmit it to the controller 5, and the controller 5 will determine whether the arm length of the boom 2 exceeds the arm length threshold according to the tension value or a combination of the tension value and the horizontal inclination angle. Wherein the in-place detecting sensor 7 may be a proximity switch or a travel switch or the like, and in this embodiment, the in-place detecting sensor 7 is electrically connected to the control 5 through a third connection line 71.

The in-place detecting sensor 7 is disposed at the joint between the boom 2 and the luffing mechanism 3, and may be disposed at the boom 2 or the luffing mechanism 3, for example, as shown in FIG. 2 and FIG. 6, in the embodiment, the in-place detecting sensor 7 is disposed at the top of the boom heel section 21. One or more of the in-place detecting sensors 7 may be provided, for example two of the in-place detecting sensors 7 may be arranged symmetrically along the rotation axis direction of the boom 2.

Figure 7:
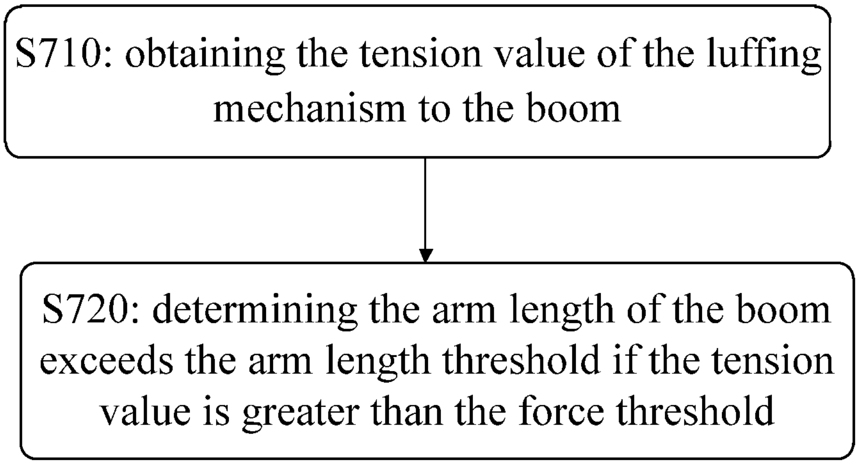
FIG. 7 is a flow diagram of a control method of crane provided by the embodiment of the present application.

The control method of the crane according to the embodiment of the present application will be described below with reference to FIG. 7, which is realized based on the crane as described above. As shown in FIG. 7, the control method of crane according to the embodiment of the present application includes steps S710 to S720.

Step S710: obtaining the tension value of the luffing mechanism to the boom.

Specifically, the crane can detect the tension value of the luffing mechanism to the boom through the tension sensor, and transmit the detected tension value to the controller. Optionally, the tension sensor can detect the tension value of the luffing mechanism to the boom in real time or periodically.

Step S720: determining the arm length of the boom exceeds the arm length threshold if the tension value is greater than the force threshold.

Specifically, after obtaining the tension value of the luffing mechanism to the boom, the controller can determine the arm length of the boom according to the tension value of the luffing mechanism, and the controller determines that the arm length of the boom exceeds the arm length threshold when the tension value is greater than the tension threshold;

the controller determines that the arm length of the boom does not exceed the arm length threshold when the tension value is less than the tension threshold; the judgment result of the controller can be set according to the actual situation when the tension value is equal to the tension threshold. In one case, the controller determines that the arm length of the boom exceeds the arm length threshold when the tension value is equal to the tension threshold; In another case, the controller determines that the arm length of the boom does not exceed the arm length threshold when the tension value is equal to the tension threshold.

Optionally, after determining whether the arm length of the boom exceeds the arm length threshold according to the tension value, the control method of the crane further includes: generating a protection signal if it is determined that the arm length of the boom exceeds the arm length threshold; and there is no protection signal is generated if it is determined that the arm length of the boom does not exceed the arm length threshold.

Specifically, the protection signal is used to prohibit the luffing mechanism from performing the boom lifting. When no protection signal is generated by the controller, no subsequent protection will be performed, and the luffing mechanism is allowed to perform the boom lifting; when the controller generates the protection signal, prohibiting the luffing mechanism from performing the boom lifting, so as to achieving the effect of avoiding overload damage to the boom 2.

In addition to determining whether the arm length of the boom exceeds the arm length threshold according to the tension value, the controller can also determine whether the arm length of the boom exceeds the arm length threshold according to the tension value and the horizontal inclination value of the boom. Optionally, the controller may determine whether the arm length of the boom exceeds the arm length threshold according to the tension value and the horizontal inclination value through the following steps.

First, before performing step S720, obtaining the horizontal inclination value of the boom.

Specifically, the crane can detect the horizontal inclination value of the boom through an angle sensor, and transmit the detected horizontal inclination value to the controller. Optionally, the angle sensor can detect the horizontal inclination value of the boom in real time or periodically.

Then, determining the arm length of the boom exceeds the arm length threshold if the horizontal inclination value is less than an angle threshold and the tension value is greater than the tension threshold.

Specifically, the controller determines that the boom is in the self-loading and unloading state when the horizontal inclination value is greater than the angle threshold, and will not perform the step of determining whether the arm length of the boom exceeds the arm length threshold according to the tension value. the controller determines that the boom is in the cantilevering state when the horizontal inclination value is less than the angle threshold, and performs the step of determining whether the arm length exceeds the arm length threshold according to the tension value, that is, the controller determines that the arm length exceeds the arm length threshold when the horizontal inclination value is less than the angle threshold and the tension value is greater than the tension threshold; and the controller determines that the arm length does not exceed the arm length threshold when the horizontal inclination value is less than the angle threshold and the tension value is less than the tension threshold. When the horizontal inclination angle is equal to the angle threshold, the judgment result of the controller 5 can be set according to the actual situation. In one case, the controller 5 determines that the boom 2 is in a self-loading and unloading state when the horizontal inclination angle is equal to the angle threshold; in another case, the controller 5 determines that the boom 2 is in a cantilevering state when the horizontal inclination angle is equal to the angle threshold.

The controller can also determine whether the arm length of the boom exceeds the arm length threshold according to the tension value and the trigger signal. Optionally, the controller can determine whether the arm length of the boom exceeds the arm length threshold according to the tension value and the trigger signal through the following steps.

Specifically, step S720: determining the arm length of the boom exceeds the arm length threshold if the trigger signal is received and the tension value is greater than the tension threshold.

Specifically, the crane can detect whether the boom is connected with the luffing mechanism through the in-place detecting sensor. When the in-place detecting sensor detects that the boom is connected with the luffing mechanism, the in-place detecting sensor will generate a trigger signal and transmit it to the controller. When the controller does not receive the trigger signal, the step of determining whether the arm length of the boom exceeds the arm length threshold according to the tension value will not be performed; and when the controller receives the trigger signal, it performs the step of determining whether the arm length of the boom exceeds the arm length threshold according to the tension value. The in-place detecting sensor can detect whether the boom is connected with the luffing mechanism in real time or periodically.

The controller can also determine whether the arm length of the boom exceeds the arm length threshold according to the tension value, the horizontal inclination value and the trigger signal. Optionally, the controller can determine whether the arm length of the boom exceeds the arm length threshold according to the tension value, the horizontal inclination value and the trigger signal through the following steps.

First, determining whether the trigger signal is received.

Then, when the trigger signal is received, the controller executes the step of determining whether the arm length of the boom exceeds the arm length threshold according to the tension value and the horizontal inclination value, and when the trigger signal is not received, the controller does not execute the step of determining whether the arm length of the boom exceeds the arm length threshold according to the tension value and the horizontal inclination value.

The control device of the crane provided by the embodiment of this application is described below, the control device of the crane described below can correspondingly refer to the control method of the crane described above.

Figure 8:
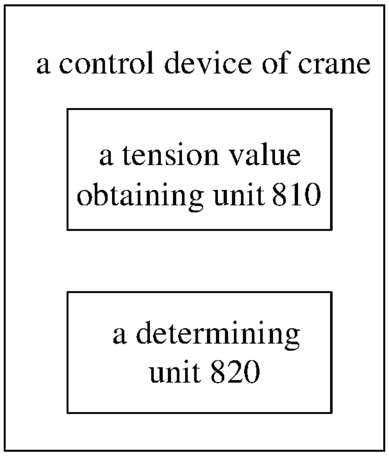
FIG. 8 is a structural schematic diagram of a control device of crane provided by the embodiment of the present application.

As shown in FIG. 8, the control device of the crane provided by the embodiment of the present application can be the above-mentioned controller or partial structure of the controller, and the control device of the crane includes a tension value obtaining unit 810 and a determination unit 820.

A tension value obtaining unit 810 is configured to obtain a tension value of the luffing mechanism to the boom; the determination unit 820 is configured to determine that the arm length of the boom exceeds the arm length threshold if the tension value is greater than the tension threshold.

Figure 9:
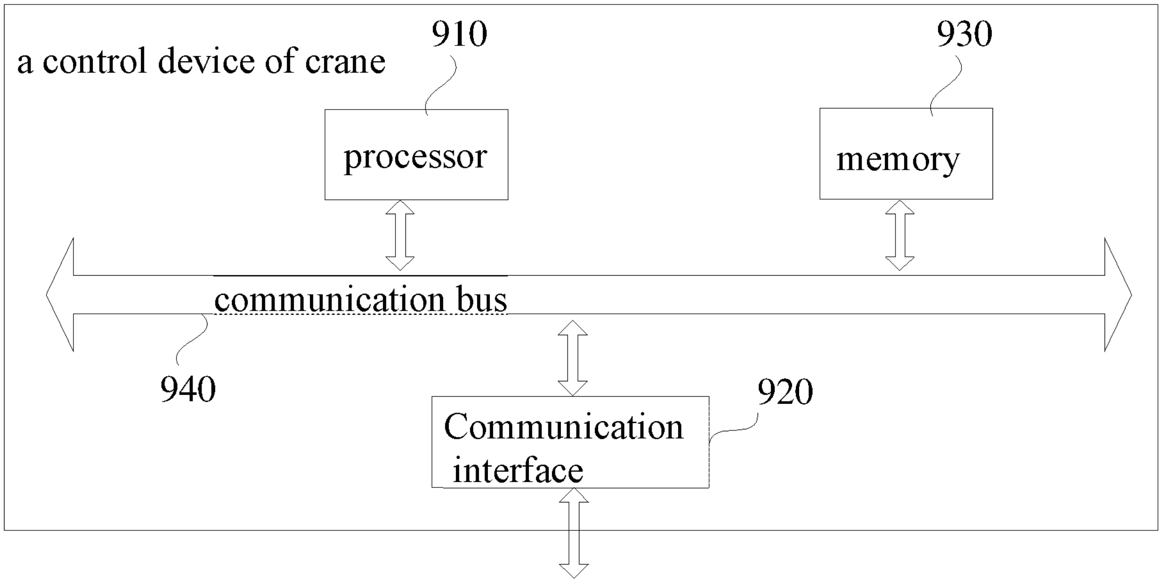
FIG. 9 is a structural schematic diagram of another control device of crane provided by the embodiment of the present application.

FIG. 9 illustrates a physical structure schematic diagram of the control device of the crane. As shown in FIG. 9, the control device of the crane provided by the embodiment of the present application can be the above-mentioned controller or partial structure of the controller. The control device of the crane may include processor 910, communication interface 920, memory 930 and communication bus 940. The processor 910, the communication interface 920 and the memory 930 communicate with each other through the communication bus 940. The processor 910 can call the logic instructions in the memory 930 to execute the control method of the crane. The method includes: obtaining a tension value of the luffing mechanism to the boom; and determining the arm length of the boom exceeds the arm length threshold if the tension value is greater than the tension threshold.

In addition, the above-mentioned logic instructions in the memory 930 can be implemented in the form of software functional units, and can be stored in a computer-readable storage medium when sold or used as an independent product. With this understanding, the essential technical scheme of this application, or the part of the technical scheme of this application that contributes to the prior art, or the part of this technical solution, can be embodied in the form of a software product, which is stored in a storage medium and includes a number of instructions to make a computer device (which can be a personal computer, a server, or a network device, etc.) perform all or part of the steps of the methods described in various embodiments of this application. The aforementioned storage media include: USB Disk, mobile hard disk, Read-Only Memory (ROM), Random Access Memory (RAM), magnetic disk or laser disc and other media that can store program codes.

On the other hand, the embodiment of the present application also provides a computer program product, which includes a computer program stored on a non-transient computer readable storage medium, and the computer program includes program instructions, and when the program instructions are executed by a computer, the computer can execute the control methods of cranes provided by the above method embodiments. The control method includes the following steps: obtaining the tension value of the luffing mechanism to the boom; determining the arm length of the boom exceeds the arm length threshold if the tension value is greater than the tension threshold.

On the other hand, the embodiment of the present application also provides a non-transient computer readable storage medium, on which a computer program is stored, and the computer program is implemented when executed by a processor to execute the control method of the crane provided by the above embodiments, and the control method includes: obtaining the tension value of the luffing mechanism to the boom; determining the arm length of the boom exceeds the arm length threshold if the tension value is greater than the tension threshold.

According to the crane and the control method therefor provided by the embodiment of the application, the tension sensor detects the tension value of the luffing mechanism to the boom, and according to the tension value, it can be determined whether the arm length exceeds the arm length threshold, thus avoiding the problem of overload damage to the boom.

Finally, it should be explained that the above embodiments are only used to illustrate the technical scheme of this application, but not to limit it; Although the application has been described in detail with reference to the foregoing embodiments, it should be understood by those skilled in the art that it is still possible to modify the technical solutions described in the foregoing embodiments, or equivalently replace some technical features thereof; These modifications or substitutions do not make the essence of the corresponding technical solutions deviate from the spirit and scope of the technical scheme of the embodiments of this application.

What is claimed is:

1. A crane, comprising:

a body, a boom, one end of the boom being rotationally connected with the body;

a luffing mechanism, connected with the body and the boom respectively;

a tension sensor, disposed on the luffing mechanism, the tension sensor being used for detecting a tension value of the luffing mechanism to the boom;

a controller, electrically connected with the tension sensor and the luffing mechanism, the controller being configured to determine that an arm length of the boom exceeds an arm length threshold if the tension value is greater than a tension threshold; and an angle sensor, wherein the angle sensor is disposed on the boom, and the angle sensor is used for detecting a horizontal inclination angle value of the boom;

the controller is electrically connected with the angle sensor, and the controller is configured to determine that the arm length of the boom exceeds the arm length threshold if the horizontal inclination angle value is less than an angle threshold and the tension value is greater than the tension threshold.

2. The crane according to claim 1, wherein the boom comprises a boom heel section rotationally connected with the body, and the angle sensor is disposed on the boom heel section.

3. The crane according to claim 1, further comprising an in-place detecting sensor, wherein the in-place detecting sensor is disposed at a joint between the boom and the luffing mechanism, and the in-place detecting sensor is used for generating a trigger signal when the boom is being connected with the luffing mechanism;

the controller is electrically connected with the in-place detecting sensor, and the controller is configured to determine that the arm length of the boom exceeds the arm length threshold when the trigger signal is received and the tension value is greater than the tension threshold.

4. The crane according to claim 3, wherein the in-place detecting sensor is a proximity switch or a travel switch.

5. The crane according to claim 1, wherein the luffing mechanism is connected with the boom through a boom pull plate and a luffing rope, and the tension sensor is disposed on the boom pull plate or the luffing rope.

6. A control method of a crane, comprising:

obtaining a tension value of a luffing mechanism to a boom; and determining an arm length of the boom exceeds an arm length threshold if a tension value is greater than a tension threshold; wherein before determining the arm length of the boom exceeds the arm length threshold if the tension value is greater than the tension threshold, the control method further comprises:

obtaining a horizontal inclination angle value of the boom;

wherein determining the arm length of the boom exceeds the arm length threshold if the tension value is greater than the tension threshold comprises:

determining the arm length of the boom exceeds the arm length threshold if the horizontal inclination angle value is less than an angle threshold and the tension value is greater than the tension threshold; and after determining the arm length of the boom exceeds the arm length threshold if the tension value is greater than the tension threshold, the control method further comprises:

generating a protection signal, wherein the protection signal is used for prohibiting the luffing mechanism from performing the boom lifting.

7. The control method according to claim 6, wherein determining the arm length of the boom exceeds the arm length threshold if the tension value is greater than the tension threshold comprises:

determining the arm length of the boom exceeds the arm length threshold if a trigger signal is received and the tension value is greater than the tension threshold, wherein the trigger signal is used to indicate that the boom connects with the luffing mechanism.

8. A control device of a crane, comprising: a memory, a processor and a computer program stored in the memory and running on the processor, wherein when the processor executes the program, the control method of the crane as claimed in claim 6 is implemented.

9. A non-transitory computer readable storage medium on which a computer program is stored, wherein, when the computer program is executed by a processor, steps of a control method of a crane implemented by the processor comprise:

obtaining a tension value of a luffing mechanism to a boom;

determining an arm length of the boom exceeds an arm length threshold if a tension value is greater than a tension threshold, wherein before determining the arm length of the boom exceeds the arm length threshold if the tension value is greater than the tension threshold, the steps of the control method of the crane implemented by the processor further comprise:

obtaining a horizontal inclination angle value of the boom;

wherein determining the arm length of the boom exceeds the arm length threshold if the tension value is greater than the tension threshold comprises:

determining the arm length of the boom exceeds the arm length threshold if the horizontal inclination angle value is less than an angle threshold and the tension value is greater than the tension threshold; and after determining the arm length of the boom exceeds the arm length threshold if the tension value is greater than the tension threshold, the steps of the control method of the crane implemented by the processor further comprise:

generating a protection signal, wherein the protection signal is used for prohibiting the luffing mechanism from performing the boom lifting.

10. The non-transitory computer readable storage medium according to claim 9, wherein determining the arm length of the boom exceeds the arm length threshold if the tension value is greater than the tension threshold comprises:

determining the arm length of the boom exceeds the arm length threshold if a trigger signal is received and the tension value is greater than the tension threshold, wherein the trigger signal is used to indicate that the boom connects with the luffing mechanism.

* * * * *